United States Patent

[11] 3,569,687

| [72] | Inventor | Edward H. Dinger<br>Waynesboro, Va. |
|---|---|---|
| [21] | Appl. No. | 723,659 |
| [22] | Filed | Apr. 24, 1968 |
| [45] | Patented | Mar. 9, 1971 |
| [73] | Assignee | General Electric Company |

[54] PULSE RATE TO ANALOG CONVERTER PRODUCING AN ANALOG OUTPUT SIGNAL PROPORTIONAL TO THE PRODUCT OF TWO INPUT PULSE RATES
12 Claims, 3 Drawing Figs.

[52] U.S. Cl..................................................... 235/194,
235/150.3, 235/150.52
[51] Int. Cl...................................................... G06j 7/16,
G06j 1/02
[50] Field of Search........................................... 235/194,
150.3, 150.5 (t), 195, 196; 328/140, 26; 307/261

[56] References Cited
UNITED STATES PATENTS

| 2,956,227 | 10/1960 | Pierson.................... | 328/26X |
| 3,219,948 | 11/1965 | Cooke-Yarborough...... | 328/140 |
| 3,400,257 | 9/1968 | Smith......................... | 340/347X |
| 3,461,392 | 8/1969 | Hughes et al............... | 328/140X |
| 3,466,550 | 9/1969 | Wolf et al................... | 328/140 |

Primary Examiner—Malcolm A. Morrison
Assistant Examiner—Joseph F. Ruggiero
Attorneys—Lawrence G. Norris, Michael Masnik, Stanley C. Corwin, Frank L. Neuhauser, Oscar B. Waddell and Melvin M. Goldenberg ABSTRACT: Circuitry for converting a plurality of pulses into an analogue signal having a magnitude representative of the number of pulses supplied.

PATENTED MAR 9 1971   3,569,687

*INVENTOR.*
EDWARD H. DINGER
BY
HIS ATTORNEY

PULSE RATE TO ANALOG CONVERTER PRODUCING AN ANALOG OUTPUT SIGNAL PROPORTIONAL TO THE PRODUCT OF TWO INPUT PULSE RATES

BACKGROUND OF THE INVENTION

In the electrical arts it is frequently necessary to develop a signal having a magnitude that is discretely representative of a particular characteristic of another signal. This is a particularly important function when the basic circuitry operates on a digital basis and it is desired to convert the digital data to commensurate analogue values. The present invention is concerned with applications where input information is provided in the form of repetitive pulses and it is desired to produce an analogue signal representative of the repetition rate.

In many digital systems, the pulse height and pulse duration are not maintained with criticality because it is simply the presence or absence of a pulse that is of interest. Furthermore, the transmission and utilization of pulsed signals leads to distortion of the pulse shape. Accordingly, when it is desired to develop an analogue signal that is representative of a pulse rate, the conversion means must be operative with precision irrespective of variations in either the magnitude or the width of the input pulses.

SUMMARY OF THE INVENTION

The present invention relates to a pulse rate to analogue converter; more particularly, it relates to a pulse rate to analogue converter operative to produce a voltage signal having an amplitude proportional to the input pulse rate.

It is an object of the invention to provide a pulse rate to analogue converter that provides an accurate analogue representation of the pulse rate of all input pulses having a magnitude in excess of a predetermined level.

Another object of the invention is to provide an improved pulse rate to analogue converter which is relatively insensitive to variations in pulse width above a predetermined amount.

Another object of the present invention is to provide improved pulse rate to analogue converters which can be combined to produce an analogue output signal that is proportional to the product of two input pulse rates.

In accordance with the invention, there is provided a circuit for generating a direct voltage proportional to the rate of applied pulses, comprising a first electrical storage means, switching means operative in response to each applied pulse to initiate charging of said first storage means, a second electrical storage means, and charging means operative during a predetermined interval from the commencement of the charging of the first storage means to charge the second storage means with a discrete fixed charge.

In accordance with a further aspect of the invention there is provided a converter of the nature described above wherein two circuits are interconnected in order to provide an analogue voltage having a magnitude proportional to the product of the repetition rates of two input pulse trains.

DESCRIPTION OF THE PREFERRED EMBODIMENT

The general theory of operation of the present invention concerns the deposit of a predetermined electrical charge in a storage means upon each occurrence of an input pulse. The effect of this periodic deposit is to build up an analogue voltage proportional to the number of input pulses. In carrying out the desired functions, two transistors cooperate as a switch to control the charging of a first capacitor. This capacitor is usually held at a relatively low voltage level; but when an input pulse appears, the switching action of the transistors causes it to begin charging toward the value of the supply voltage. Coincident with the beginning of this charging cycle, a metering transistor switches into conduction and begins supplying current to an output capacitor. After a fixed period of time the charge buildup on the first capacitor causes the metering transistor to cut off. This sequence of events repeats for each input pulse and the charge stored in the output capacitor is thus proportional to the number of input pulses received.

Figure 1:
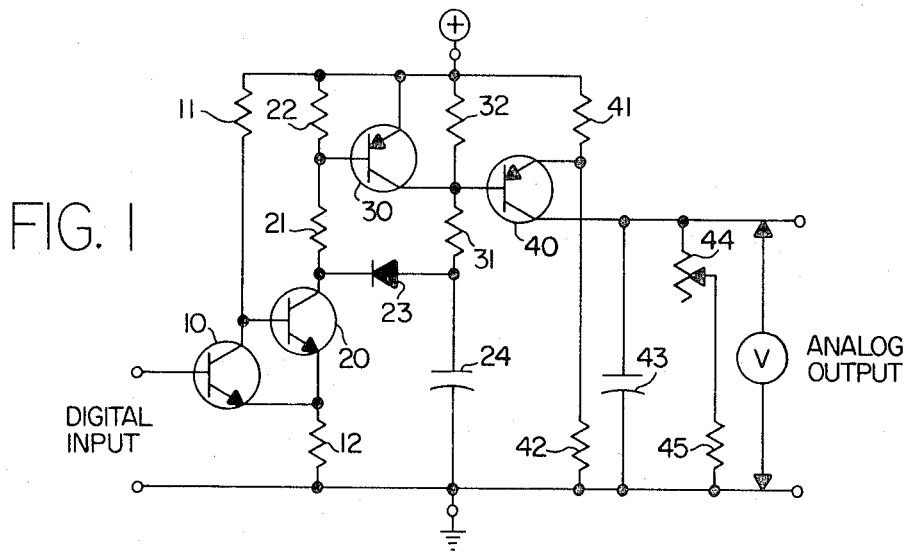
FIG. 1 is a circuit diagram of an illustrative embodiment of the invention.

As shown in FIG. 1, a circuit according to the present invention may include four transistors 10, 20, 30, and 40 and associated circuit elements. Under quiescent conditions, the elements and supply voltage are chosen so that transistors 10 and 40 are nonconductive and transistors 20 and 30 are conductive.

In order to effect these conditions the collector of NPN transistor 10 is connected to a positive supply via resistor 11 and the emitter thereof is connected to the ground via a resistor 12. In addition, the collector of transistor 10 is directly connected to the base of NPN transistor 20 and its emitter is directly connected to the emitter of transistor 20. The collector of transistor 20 is connected to the positive supply voltage via serially connected resistors 21 and 22 and the collector is also connected through a diode 23 to one terminal of a capacitor 24; the other terminal of the capacitor being returned to ground. Diode 23 is oriented in order to permit current flow from the capacitor to the collector of transistor 20.

PNP transistor 30 has its emitter connected to the positive supply and its collector is connected via a resistor 31 to the junction between diode 23 and capacitor 24. In addition, the collector is connected directly to the base of transistor 40, and via resistor 32 to the positive supply. The emitter of PNP transistor 40 is connected to a voltage divider comprising resistors 41 and 42 which are across the voltage supply; thus, the emitter is held at a voltage determined by the relative magnitudes of resistors 41 and 42.

Figure 2:
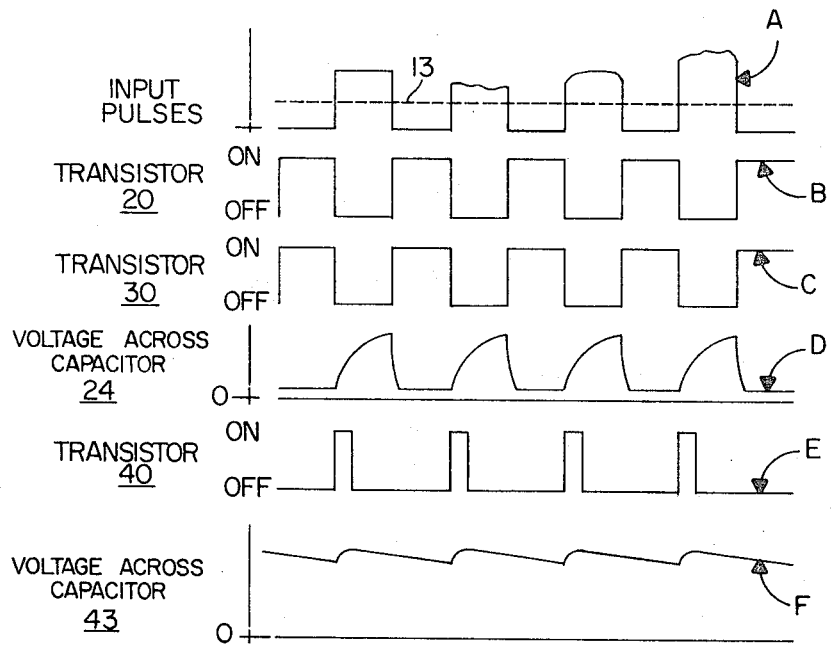
FIG. 2 contains a plurality of illustrative waveforms depicting the state of various circuit elements and the voltages present at selected points in the circuit of FIG. 1.

An understanding of the operation of the described circuit may be had by reference to the waveforms appearing in FIG. 2. Waveform A is a voltage versus time representation of a train of input pulses of the type that may be applied between the base of transistor 10 and ground. As previously mentioned, transistor 10 is normally biased to a nonconducting state. However, when the magnitude of the input pulses exceeds a predetermined voltage level, e.g. 13, transistor 10 is rendered conductive, and this effects a lowering of the voltage at its collector and a raising of the voltage at its emitter. Transistors 10 and 20 are interconnected to function as a switch that reverses its state when the input pulses exceed a predetermined level. Accordingly, normally conducting transistor 20 is cut off when transistor 10 begins conducting. This is illustrated in waveform B.

During conduction of transistor 20, the voltage on the upper terminal of capacitor 24 is held to a relatively low value as a result of the current path through diode 23, the collector-emitter path of transistor 20 and resistor 12. When transistor 20 is switched to a nonconductive state upon the appearance of an input pulse, the low impedance discharge path for capacitor 24 is removed and it begins charging toward the voltage level of the supply. This is illustrated in waveform D. Inasmuch as the transistors 10 and 20 are connected as an emitter coupled switch, the level to which capacitor 24 is held during the period between input pulses is independent of the exact level of the input as long as the input is low enough to prevent the switching on of transistor 10.

During quiescent conditions, transistor 30 is conducting and therefore holds the base of transistor 40 at a sufficiently high bias level to maintain it nonconductive. The current flowing through transistor 30 does not affect the voltage across capacitor 24 because of the low impedance path through diode 23 and transistor 20. However, when transistor 20 is switched off, the voltage at the junction of resistors 21 and 22 approaches the value of the positive supply and transistor 30 ceases conduction. Thus, the base of transistor 40 is no longer held at a cutoff level and it immediately begins to conduct and supply current to output capacitor 43.

As previously noted, when transistor 20 is cut off, capacitor 24 begins charging toward the level of the supply voltage through series resistors 31 and 32. Obviously, the voltages across resistors 31 and 32 are proportional to the charging current into capacitor 24. Since the junction between these resistors is connected to the base of transistor 40, the current flowing through the emitter resistor 41 of this emitter follower circuit is proportional to the voltage across resistor 32. It will thus be seen that the current flowing through transistor 40 during this initial charging of capacitor 24 is proportional to the charging current of capacitor 44 plus the amount contributed via bias resistor 42. In other words, the current flowing into output capacitor 43 is proportional to the charging current for capacitor 24.

As the charge builds up on capacitor 24, the voltage drop across resistors 31 and 32 decreases until the voltage at the junction thereof is less than the sum of the base-emitter voltage of transistor 40 and the bias voltage established by resistors 41 and 42. At this time, transistor 40 will be cut off and its collector current will no longer charge capacitor 43. The described sequence of events including the conduction period of transistor 40 and the charging of capacitor 43 are shown in waveforms E and F respectively.

It will be understood that capacitor 24 continues charging toward the positive supply voltage and if the input pulse is sufficiently wide to hold transistor 10 in a conducting state, capacitor 24 may become fully charged. In order to register the occurrence of an input pulse, however, it is only necessary that the pulse be wide enough to insure that capacitor 24 charges up to a level at which transistor 40 is rendered nonconductive. When this condition is met, the amount of charge added to capacitor 43 in response to each input pulse is always the same and it is proportional to the amount of charge required to charge up capacitor 24 to the point where transistor 40 is cut off. For any input pulses occurring at a repetition rate below that at which capacitor 24 doesn't have time to charge up sufficiently, the amount of charge added to capacitor 43 per input pulse is constant. Stated another way, the input current to capacitor 43 is equal to the charge per pulse times the number of pulses per second. By utilizing the early portion of the charge cycle of capacitor 24, it will be appreciated that considerable linearity in the conduction period of transistor 40 can be achieved.

The average value of the voltage appearing across capacitor 43 is independent of the size thereof; however, the shape of the voltage waveform will vary. Higher capacitive values produce a smoother direct voltage, whereas lower values produce a faster response to changes in the input pulse rate. The magnitude of capacitor 43 is accordingly selected to provide the best balance between ripple and response for any particular application.

Output capacitor 43 is discharged at a constant rate due to the presence of a discharge path through resistor 45 and variable resistance 44. Thus, the discharge current is proportional to the voltage across the capacitor and inversely proportional to the combined impedance of elements 44 and 45. It is apparent that the level at which the output voltage will stabilize for any particular pulse rate is the voltage at which the discharge current just equals the average current supplied by transistor 40. The following equation states the pertinent relationship:

$$KN = \frac{V}{R} \qquad \text{I}$$

where $K$ is the charge per pulse, $N$ is the number of pulses per second, $V$ is the voltage on capacitor 43, and $R$ is the total resistance of the discharge path.

Figure 3:
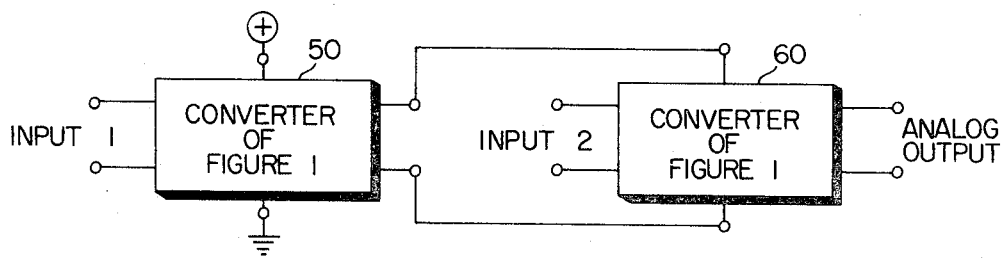
FIG. 3 is a block diagram illustrating the interconnection of two circuits of the type shown in FIG. 1 in order to provide an analogue output voltage proportional to the product of the repetition rates of two input pulse trains.

As indicated hereinbefore, it is possible to utilize the basic circuit shown in FIG. 1 in conjunction with a similar circuit in order to obtain an analogue signal proportional to the product of two input pulse rates. Referring to FIG. 3, it will be seen that two converters 50 and 60 are shown. The circuitry of each of these converters is the same as that illustrated in FIG. 1.

The supply voltage for converter 50 is of a fixed value and therefore the voltage output is proportional to its input pulse rate. The output voltage of converter 50 is used as the supply voltage for converter 60. In some applications, an emitter follower stage or other boosting circuitry may be employed between the converters in order to minimize loading of the first converter by the second.

Since the supply voltage for converter 60 is not a constant; but rather a value that is proportional to the output of converter 50, the charge per second supplied to the output capacitor of converter 60 will vary depending upon the output voltage from converter 50 as well as in proportion to the input pulse rate of input 2. The following equation represents the functioning of converter 60;

$$K_2 V_{01} N_2 = \frac{V_{02}}{R_2} \qquad \text{II}$$

where $K_2 V_{01}$ is the charge per second of the output capacitor as effected by the output voltage ($V_{01}$) from converter 50, $N_2$ is the number of pulses per second in input 2, $V_{02}$ is the voltage on the output capacitor, and $R_2$ is the total impedance of the discharge path.

Recognizing that equation I represents the functioning of converter 50, we can represent the output voltage of converter 50 as:

$$V_{01} = R_1 K_1 N_1 \qquad \text{III}$$

where $V_{01}$ is the output voltage, $R_1$ is the total impedance of the discharge path, $K_1$ is the charge per pulse of input 1, and $N_1$ is the number of pulses per second in input !.

Combining equations II and III yields:
$V_{02} = K_1 K_2 N_1 N_2 R_1 R_2 \qquad \text{IV}$ This illustrates that the output voltage of converter 60 is related to the product of the two input pulse rates times a constant.

In the foregoing description, the applicant has set forth an illustrative circuit for converting direct current pulses into an analogue voltage that is directly related to the number of input pulses received. Furthermore, there has been shown a technique for combining the basic circuits in order to provide an analogue voltage proportional to the multiple of two or more pulse trains. It is appreciated that modifications of the illustrated circuits will be immediately apparent to those skilled in the art. Modifications which are within the spirit and scope of the present disclosure are intended to be covered by the appended claims.

I claim:

1. A circuit for generating a direct voltage proportional to the rate of applied pulses, comprising a first electrical storage means, switching means operative in response to each applied pulse to initiate charging of said first storage means, a second electrical storage means, and charging means operative during a predetermined interval measured from the commencement of the charging of said first storage means and terminated when the voltage of said first storage means reaches an arbitrary predetermined value less than its ultimate value, to charge said second storage means with a discrete fixed charge.

2. A circuit according to claim 1, wherein said switching means is operative in response to pulses exceeding a predetermined voltage level only.

3. A circuit according to claim 2, wherein the predetermined operating period of said charging means is controlled by the charging rate of said first electrical storage means.

4. A pulse rate to analogue converter comprising first electrical storage means, switching means operative in response to voltages above a first predetermined level to initiate charging of said storage means and operative in response to voltages below a second and lower predetermined level to discharge said storage means, a second electrical storage means, and means operative during a predetermined interval measured from the commencement of the charging of said first storage means to charge said second storage means, whereby said second storage means receives a discrete charge each time said voltages exceed said first predetermined level.

5. A pulse rate to analogue converter according to claim 4, wherein said switching means comprises first and second current responsive devices, said second device providing a relatively low impedance unidirectional current discharge path across said first electrical storage means when said voltages are below said second predetermined level.

6. A pulse rate to analogue converter according to claim 5, wherein the means for charging said second storage means is a third current responsive device controlled by the charge on said first storage means.

7. A pulse rate to analogue converter according to claim 6, including a normally conductive current response device controlled by said second device and operative to maintain said third device in a nonconductive state when said voltages are below said predetermined level.

8. An arrangement according to claim 1 comprising a second circuit similar to said first-mentioned circuit and means for applying the direct voltage output of said first-mentioned circuit as a supply voltage to said second circuit, and means for applying pulses of a given repetition rate to said second-mentioned circuit to generate a direct voltage proportional to the rate of said last-mentioned pulses and said direct voltage output.

9. A circuit for generating a direct voltage proportional to the product of a first pulse rate and a second pulse rate, comprising first and second pulse rate to analogue converters each responsive to a direct voltage and a plurality of pulses to produce an output analogue voltage that is proportional to the rate of said plurality of pulses, means for applying pulses of said first and second pulse rates to said first and second converters respectively, means for applying a fixed direct voltage to said first converter, and means for connecting said analogue output voltage of said first converter as the direct voltage input of said second converter.

10. A circuit for generating a direct voltage proportional to the rate of applied input pulses comprising a first electrical storage means, switching means operative in response to each applied input pulse to charge said first storage means, a second electrical storage means, charging means for charging said second storage means with a discrete fixed charge substantially independent of the amplitude or duration of said applied pulses comprising means for rendering said charging means operative during a predetermined interval measured from the commencement of the charging of said first storage means and terminated at a fixed time thereafter but prior to the termination of the corresponding input pulse.

11. A circuit for generating a direct voltage proportional to the rate of applied pulses, comprising a first electrical storage means, switching means operative in response to each applied pulse to initiate charging of said first storage means, a second electrical storage means, and charging means operative during a predetermined interval measured from the commencement of the charging of said first storage means and terminated when the voltage of said first storage means reaches a given determined value less than its ultimate value, to cause a current proportional to the rate of change of charge of said first storage means during said predetermined measured interval.

12. A circuit for generating a direct voltage proportional to the rate of applied pulses, comprising a first electrical storage means, switching means operative in response to each applied pulse to initiate charging of said first storage means, a second electrical storage means, and charging means operative during a predetermined interval measured from the commencement of the charging of said first storage means and terminated when the energy stored in said first storage means reaches an arbitrary predetermined value less than its ultimate value with a charge proportional to the charge acquired by said first storage means during said interval.